Patented Aug. 23, 1949

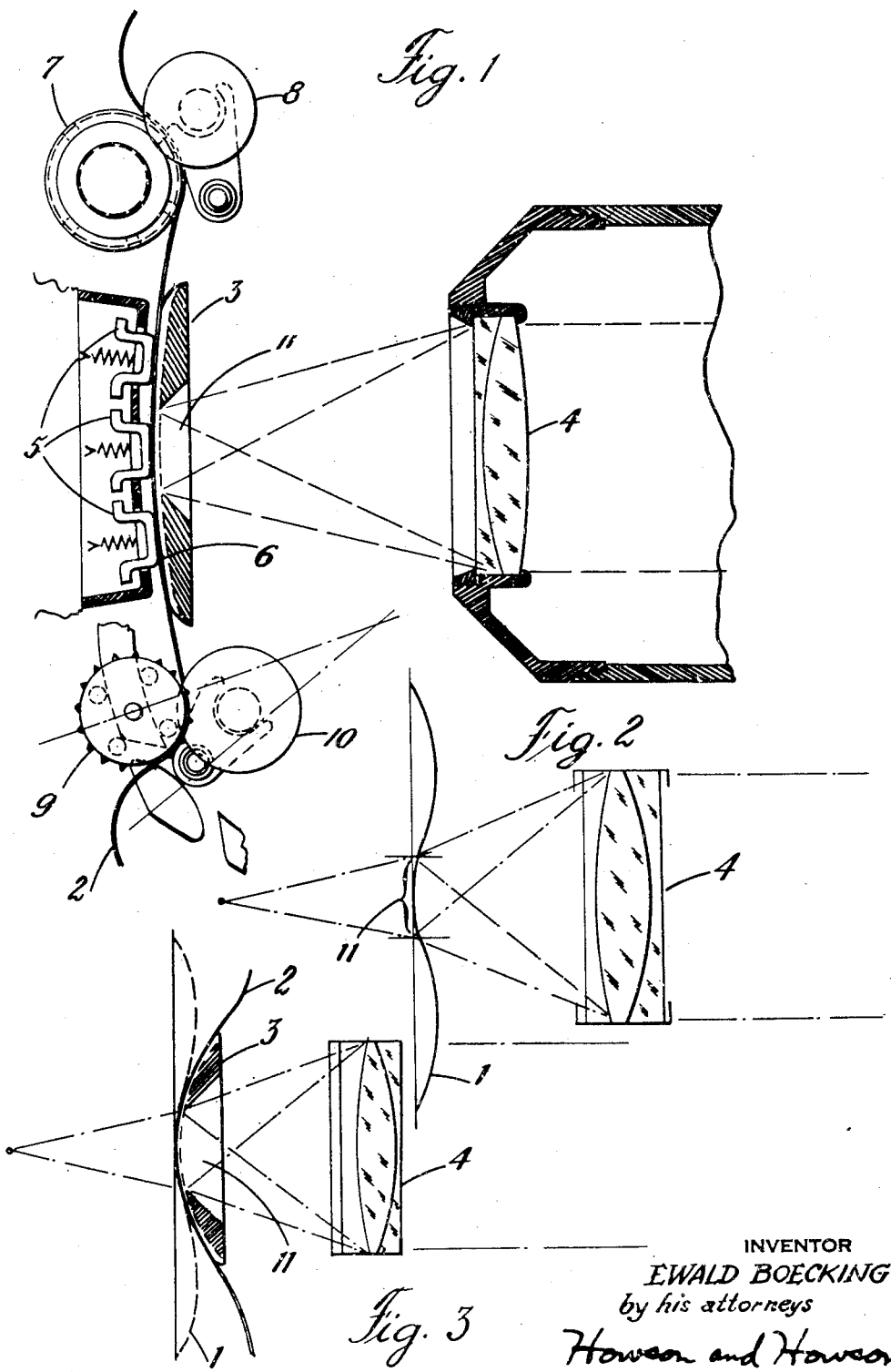

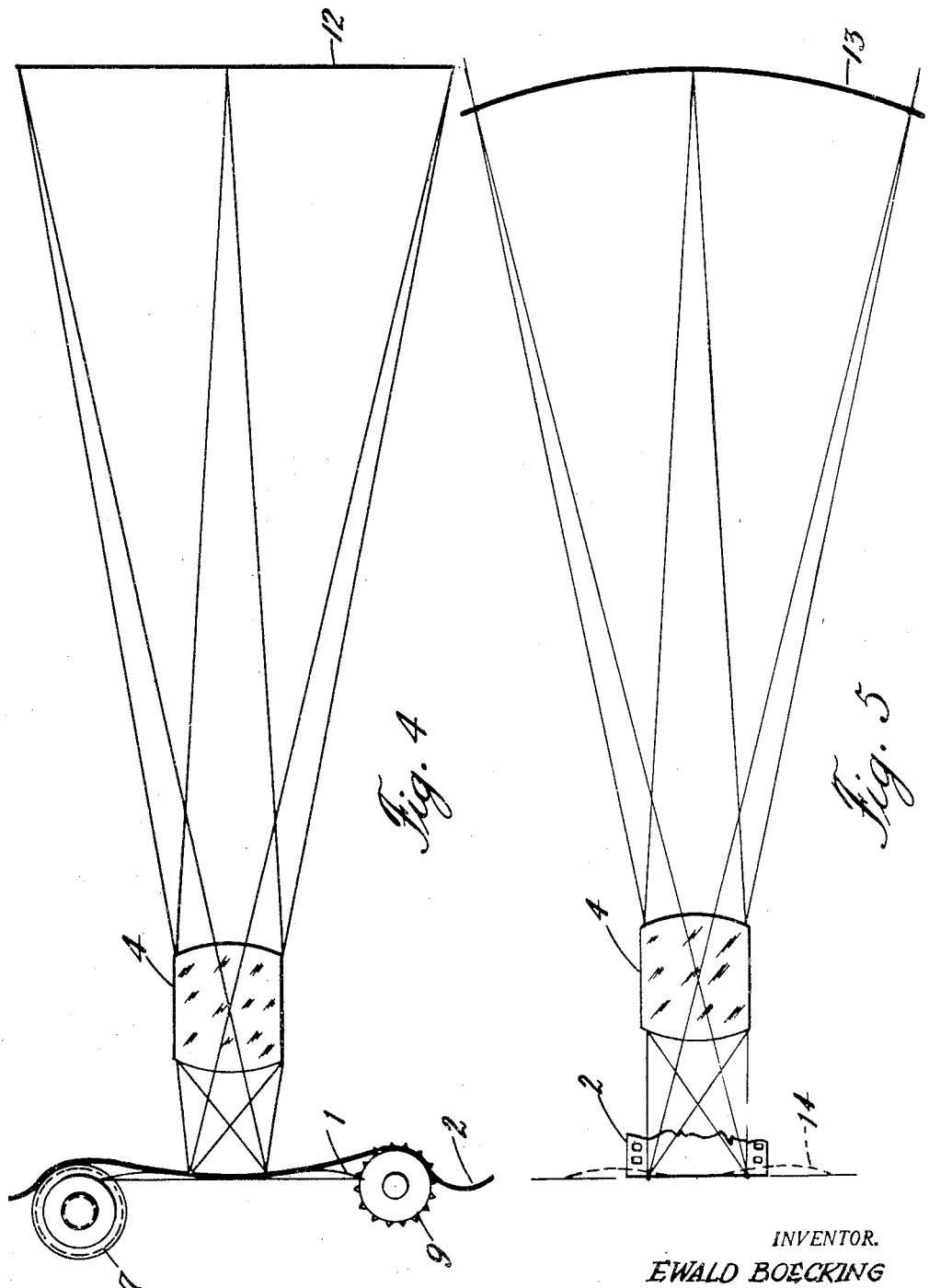

2,479,553

UNITED STATES PATENT OFFICE 2,479,553

FILM PICTURE PROJECTION SYSTEM CORRECTED FOR SPHERICAL ABERRATION

Ewald Boecking, Great Kills, N. Y., assignor to Manufacturers Machine & Tool Co., Inc., Mount Vernon, N. Y., a corporation of New York Application December 13, 1944, Serial No. 567,967

5 Claims. (Cl. 88—24)

1

This invention relates to a film picture projection system and more particularly to means eliminating distortion such as spherical aberration in motion picture projection. One object of the invention is to avoid the introduction of distortions in the projection of images from films and especially in the projection of motion pictures. The distortions avoided include those resulting from buckling of the film and the spherical aberrations resulting from exposure of the film to the light while the film is in a flat plane.

While the invention will be shown and described in connection with motion picture projection, it should be understood that the invention is useful in any optical system which projects the image of a film picture, as for example, a photographic enlarging process.

In the drawings:

Figure 1 is a view in vertical section through the film gate and lens of a motion picture projector made in accordance with my invention;

Figure 2 is an exaggerated diagrammatic view in elevation showing the spherical aberration of the ordinary projecting lens such as shown in Figure 1;

Figure 3 is a diagrammatic view similar to Figure 2 showing the effect of my novel film gate on the aberrations of Figure 2;

Figure 4 is a diagrammatic view in side elevation of my entire novel projection system as applied to motion picture work; while Figure 5 is a diagrammatic view similar to Figure 4, but taken in a horizontal plane, showing a further feature of my invention.

It is well known that present day optical lenses used in motion picture projectors introduce a spherical aberration when projecting a film presented to them in a vertical and straight plane. The line of spherical aberration, known as the Petzval curve is indicated by the line 1 in Fig. 2, and for all portions of a picture to be in focus simultaneously the film should be bent as shown in that line. Any slight error introduced at this point is multiplied many times when the image is projected on the screen, the multiplication corresponding to the magnification power of the lens system. It might be noted that the increased distance of the edge of the screen from the focal center does not compensate for the extra distance from the top of the film picture from the focal

2 point—actually the in-focus point for the top of the film picture is short of the ordinary screen. The distortions due to chromatic aberration follow somewhat the same line as the spherical aberration in the present day lenses. These two types of imperfections in the projected picture become more pronounced as the width of the projected film increases or the angle of the lens becomes wider. Thus the new "wide" film projector or the rear screen projector will find the invention particularly useful.

Another error in picture projection, and especially in motion picture projection, is that due to "buckling" of the film. It is well known that film tends to curl at the edges toward the emulsion side of the film. Since it is the Celluloid or non-emulsion side of the film which faces the projected image, it will be seen by comparison with Fig. 2 that this buckling causes additional distortion. It is very difficult to prevent buckling of a motion picture film at the moment of projection.

According to my invention, all these errors can be eliminated and an image projected which is in focus at all points and has no spherical errors. It is characteristic of my invention that the film is given a vertically concave shape while passing the light aperture 11. In Fig. 1, for example, it will be seen that the film 2 has a concave side facing the film gate 3, i. e., on the side facing toward the lens 4 and the projected image beyond the lens. The light source is to the left of the film as viewed in this figure. It will be noted that in this position the film is convex lengthwise on the emulsion side. The film is held against the gate 3 by pressure shoes 5 acting against the edges of the film. It will be observed that the film gate has a convex surface 6 facing the film, when viewed in the vertical dimension, and the rollers 7, 8, 9 and 10 serve to hold the film against the convex surface 6 under tension. Since the emulsion side of the film faces away from the gate and toward the left, as viewed in this illustration, it will be obvious that the film is unable to buckle, as it would otherwise tend to, and the film presents a concave surface toward the lens 4 as the film passes the light aperture 11. It can be seen from a comparison of Figs. 2 and 3 that the spherical aberration line 1 of the present day lenses follows the same curve as the film 2 during that portion of its travel which is opposite the light aperture 11. It therefore follows that my novel film gate not only gives the film a wholly novel character of bend, but at one stroke eliminates both the spherical aberrations in a vertical dimension and also the errors due to buckling of the film. Stated another way, I have discovered that by so bending the film as to make it impossible for it to buckle or to roll lengthwise, I have at the same time shortened the focus and lengthened the projection of the top and bottom of the picture so that they are in focus at the same adjustment as the middle of the picture. It will be seen from Fig. 4 that I have eliminated all these troublesome imperfections without requiring any changes in the screen 12 or any part of the projector except the shape of the film gate.

The particular improvements with regard to aberration in the vertical dimension and film buckling make it possible also to use the improvements in the horizontal dimension shown in Fig. 5 to give a film projection system in which not only the film buckling is avoided but spherical aberrations are eliminated in all dimensions of the projected picture. It is mechanically impossible to curl the film emulsion side out in both the lengthwise and crosswise dimensions to cure the aberrations in both dimensions. While it is not very practical to so curve the screen 12 of Fig. 4 as to make it concave and thereby correct for spherical aberrations in both vertical and horizontal dimensions, it is perfectly practical to curve the screen slightly on the surface of a cylinder having a vertical axis so that as observed from above, the screen 13 would be curved as shown in Fig. 5. By observing the dotted line 14 showing the spherical aberration in the horizontal dimension, it will be seen that this would correct for aberrations in the horizontal dimension. Combined with correction in a vertical dimension and the anti-film-buckling of my novel gate, this gives an optical film projection system that corrects for spherical aberrations in all dimensions and prevents buckling.

What I claim is:

1. In a motion picture projection system, a projector having a light aperture, a projection lens system associated therewith and means giving the film a slight concave bend lengthwise on the side toward the lens opposite the light aperture, the lengthwise curve of the film being substantially equal to the Petzval spherical aberration curve, the curve beginning with the incidence height of 0 at the center of the picture, in combination with a screen having a slight bend in a direction at right angles to the bend of the film concave toward the film, the radius of curvature of the screen being the radius of curvature of the film multiplied by the magnification power of the lens system whereby spherical aberration due to incorrect focussing is corrected in substantially all dimensions.

2. In a motion picture projection system, a projector having a light aperture, a projection lens system associated therewith and means giving the film a slight convex bend lengthwise on the emulsion side opposite the light aperture, the bend of the film having a radius of curvature of the order of 7¼" corresponding with the portion of the Petzval spherical aberration curve beginning at the incidence height of 0, in combination with a screen having a slight bend concave toward the film at right angles to a bend in the film, the radius of curvature of the screen being of the order of the radius of curvature of the film multiplied by the magnification power of the lens system, whereby spherical aberration due to incorrect focussing is corrected in substantially all dimensions.

3. In a motion picture projection system a projector having a light aperture, a projection lens system associated therewith and a film gate giving the film a slight concave bend lengthwise on the side toward the lens opposite the light aperture, any point on the vertical axis of the picture being projected being a horizontal distance from the corresponding point on a plane normal to the light path passing through the center of the picture equal to that of the corresponding point on the Petzval spherical aberration curve with the incidence height of 0 at the center of the picture, in combination with a screen on the opposite side of the lens system from the gate having a slight concave bend on the side toward the film at right angles to the said bend of the film, any point on the horizontal axis of the screen being distant from a plane normal to the light path passing through the center of the screen a distance equal to the distance from the corresponding point on the film to its normal plane multiplied by the magnification power of the lens system, whereby spherical aberration is substantially eliminated in the image as it appears on the screen.

4. In a motion picture projection system a projector having a light aperture and projection lens system associated therewith, a film gate curved in a concave manner lengthwise on the side toward the lens system opposite the light aperture, the curvature of the film 13 mm. from the center of the picture on the vertical axis of the film being of the order of 0.3 mm. from a corresponding point on a vertical plane normal to the light path and tangent to the horizontal axis of the picture, in combination with a screen having a slight bend in a direction at right angles to the bend of the gate, a point on the screen corresponding to the point 13 mm. from the center of the film being nearer the focal center of the lens of the system than a horizontal plane normal to the light path passing through the center of the screen and tangent to the vertical axis of the screen by a distance equal to the resultant of multiplying 0.3 mm. by the magnification power of the lens system, and the radius of curvature of the gate and screen differing by multiplying the latter by the magnification power of the lens system, whereby these two curvatures combine to substantially eliminate spherical aberration from the image on the screen.

5. In a motion picture projection system designed for a 35 mm. film or larger, a projector having a light aperture, a projection lens system associated therewith and means giving the film a slight convex bend lengthwise the emulsion coated side of the film, said emulsion coated side being faced toward the source of light, said means comprising a film gate placed between the film and the lens system and having a convex side next to the film and a plurality of shoes placed between the light and film and arranged to form a concave surface next the film, the resulting curve of the film being substantially equal to the Petzval aberration curve, the curve beginning with the incidence height of 0 at the center of the picture, in combination with a screen having a slight bend in a direction at right angles to the bend of the film concave toward the film, the radius of curvature of the screen being the radius of curvature of the film multiplied by the magnification power of the lens system whereby spherical aberration due to incorrect focussing is corrected in substantially all dimensions.

EWALD BOECKING.

REFERENCES CITED

The following references are of record in the file of this patent:

UNITED STATES PATENTS

| Number | Name | Date |
| --- | --- | --- |
| 1,082,678 | Casler | Dec. 30, 1913 |
| 1,256,613 | Terwilliger | Feb. 19, 1918 |
| 1,933,783 | Wittel | Nov. 7, 1933 |
| 1,939,239 | Sulzer | Dec. 12, 1933 |
| 2,049,041 | Berggren | July 28, 1936 |
| 2,125,582 | Pratt et al. | Aug. 2, 1938 |
| 2,248,976 | Files | July 15, 1941 |
| 2,265,992 | Beck | Dec. 16, 1941 |
| 2,290,287 | Links et al. | July 21, 1942 |